(12) United States Patent
Tomisaka (10) Patent No.: US 8,061,161 B2
(45) Date of Patent: Nov. 22, 2011

(54) MOLTEN GLASS DROPPING NOZZLE, MOLDED GLASS PRODUCT MANUFACTURING METHOD AND MOLDED GLASS PRODUCT MANUFACTURING APPARATUS

(75) Inventor: Toshiya Tomisaka, Yao (JP)

(73) Assignee: Konica Minolta Opto, Inc., Tokyo (JP)

( * ) Notice: Subject to any disclaimer, the term of this patent is extended or adjusted under 35 U.S.C. 154(b) by 333 days.

(21) Appl. No.: 12/154,252

(22) Filed: May 21, 2008

(65) Prior Publication Data

US 2009/0223251 A1  Sep. 10, 2009

(30) Foreign Application Priority Data

May 31, 2007 (JP) ................. 2007-144922

(51) Int. Cl.
*C03B 7/088* (2006.01)
*C03B 11/00* (2006.01)

(52) U.S. Cl. .............. 65/66; 65/126; 65/127; 65/324; 65/325; 65/327

(58) Field of Classification Search .......... 65/66, 127, 65/325, 126, 324, 326, 327
See application file for complete search history.

(56) References Cited

FOREIGN PATENT DOCUMENTS

| JP | 01-308840 | | 12/1989 |
| JP | 06-206730 | | 7/1994 |
| JP | 10-182169 | * | 7/1998 |
| JP | 2000-169154 | * | 6/2000 |
| JP | 2004-339002 | * | 12/2004 |

OTHER PUBLICATIONS

Mechanical Online English Tranlsation of JP 10-182169, printed from the Internet, http://dossier1.ipdl.inpit.go.jp/AIPN/odse_top—dn.ipdl?N0000=7400, on Jun. 30, 2010.*
Mechanical Online English Tranlsation of JP 2000-169154, printed from the Internet, http://dossier1.ipdl.inpit.go.jp/AIPN/odse_top_dn.ipdl?N0000=7400, on Jun. 30, 2010.*
Mechanical Online English Tranlsation of JP 2004-339002, printed from the Internet, http://dossier1.ipdl.inpit.go.jp/AIPN/odse_top_dn.ipdl?N0000=7400, on Jun. 30, 2010.*

* cited by examiner

*Primary Examiner* — Queenie Dehghan
*Assistant Examiner* — Lisa Herring
(74) *Attorney, Agent, or Firm* — Brinks Hofer Gilson & Lione (57) ABSTRACT

A molten glass dropping nozzle including: a molten glass flow path therein for flowing molten glass; and a plurality of openings of the flow path, the plurality of openings being provided on a front end of the molten glass dropping nozzle, wherein the molten glass flowing out of the plurality of openings is stored in the front end and falls as one molten glass drop.

7 Claims, 7 Drawing Sheets

MOLTEN GLASS DROPPING NOZZLE, MOLDED GLASS PRODUCT MANUFACTURING METHOD AND MOLDED GLASS PRODUCT MANUFACTURING APPARATUS

RELATED APPLICATION

This application is based on Japanese Patent Application No. 2007-144922 filed on May 31, 2007 in Japan Patent Office, the entire content of which is hereby Incorporated by reference.

TECHNICAL FIELD

The present invention relates to a molten glass dropping nozzle capable of allowing a molten glass drop to fall from the front end thereof, and a molded glass product manufacturing method and manufacturing apparatus using the aforementioned molten glass dropping nozzle.

BACKGROUND OF THE INVENTION

In recent years, there has been an increasing use of a glass-made optical element over an extensive range as a lens for digital camera, optical pickup lens for DVD and others, camera lens for mobile phones, coupling lens for optical communications, various types of mirrors and others.

In this connection, a molded glass product manufactured by press molding of a glass material with a molding die has come into more frequent use as the aforementioned glass-made optical element.

Various techniques have been proposed to manufacture the molded glass product to be used as an optical element. One of these techniques is the method of dropping the molten glass drop from a molten glass dropping nozzle to manufacture a molded glass product by direct press molding the molten glass drop using a molding die. This method is characterized by a high degree of productivity in principle, and is therefore attracting attention and is being studied with greater enthusiasm.

The method of manufacturing a molded glass product by press molding of the molten glass drop falling from the molten glass dropping nozzle (hereinafter abbreviated as "nozzle") includes: (1) a method wherein the molten glass drop is separated from the molten glass dropping nozzle and is made to fall on the lower die, whereby press molding is performed by the upper and lower molding dies (e.g., Unexamined Japanese Patent Application Publication No. H1-308840); and (2) a method wherein molten glass equivalent to a plurality of drops is retained in the lower die without molten glass drop being separated from the molten glass dropping nozzle, and the molten glass is then separated, whereby press molding is performed by the upper and lower molding dies (e.g., Unexamined Japanese Patent Application Publication No. H6-206730).

Unexamined Japanese Patent Application Publication No. H1-308840 discloses that the mass of the molten glass drop falling from the molten glass dropping nozzle can be expressed by the following formula:

$$mg = 2\pi r\gamma \quad \text{(Formula 1)}$$

wherein m is the mass of a molten glass drop, g is the gravity acceleration, r is the radius of the front end of the molten glass dropping nozzle, and γ is the surface tension of molten glass.

According to the aforementioned Formula 1, the mass of the molten glass drop is proportional to the diameter of the front end of the molten glass dropping nozzle. Thus, an increase in the diameter of the front end of the molten glass dropping nozzle provides the molten glass drop having a larger mass. In actual practice, however, the Formula 1 is applicable in a limited range. Thus, there has been a limit in the mass of the molten glass drop obtained in the conventional art.

Figure 1A:
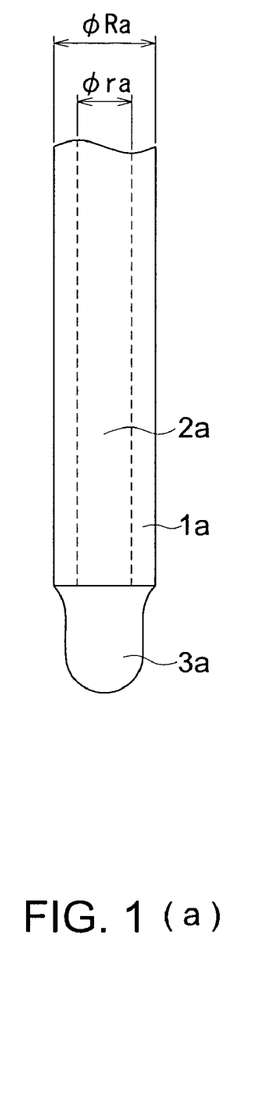
FIGS. 1(a), 1(b) and 1(c) are schematic diagrams showing the states of molten glass supplied to the front end of the conventional molten glass dropping nozzle.
Figure 1B:
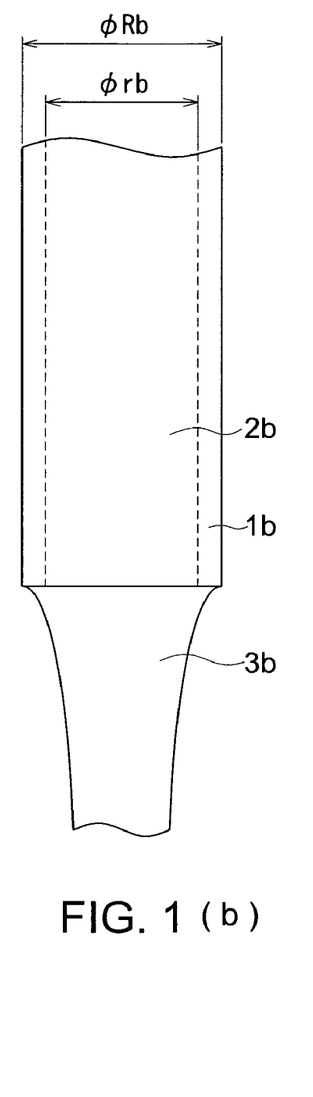
Figure 1C:
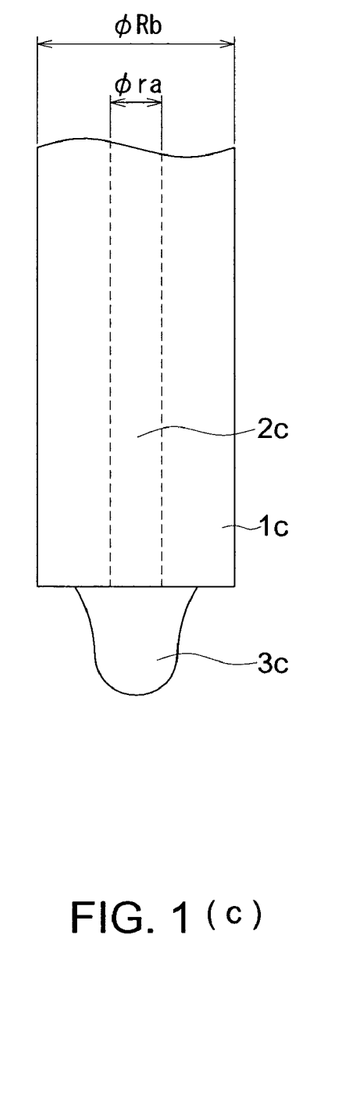

FIG. 1 is schematic diagrams showing the state of the molten glass supplied to the front end of the conventional molten glass dropping nozzle. Referring to FIG. 1, the following describes the limit of the mass of the molten glass drop when the conventional molten glass dropping nozzle is employed: FIG. 1(a) shows the nozzle 1a wherein the outer diameter φRa is comparatively small (about +10 mm or less). Molten glass is supplied to the front end through the flow path having a diameter of φra arranged inside the nozzle 1a. The molten glass drop 3a retained in the front end falls under its own weight when the molten glass drop 3a has reached to a predetermined level of mass. As described above, when there are molten glass and molten glass drop formed by wetting over an extensive range on the front end of the nozzle, the mass of the molten glass drop can be increased by increasing the outer diameter of the front end.

In the nozzle 1b of FIG. 1(b), in the meantime, both the outer diameter φRb of the nozzle and diameter φrb of the flow path are greater than the diameter of the nozzle 1a in order to get greater molten glass drops. However, if the diameter of the flow path is increased too much as in this case, there will be an increase in the flow rate of the molten glass flowing in the flow path. Thus, the molten glass flows out of the front end of the nozzle in a line, with the result that a molten glass drop is not formed on the front end.

In the nozzle 1c of FIG. 1(c), only the outer diameter φRb of the nozzle is increased, with the diameter of the flow path kept unchanged (φra). In this case, there is a smaller flow rate of the molten glass flowing through the flow path. This ensures the molten glass drop to fall from the front end without the molten glass running in a liquid line. However, unlike the case of the nozzle 1a, only the center portion of the front end of the nozzle gets wet with the molten glass. The molten glass does not cover the peripheral portion. Thus, the mass of the molten glass drop is only slightly different from that in the case of nozzle 1a. A further increase in the outer diameter of the front end does not increase the mass of the molten glass drop.

As described above, in the conventional molten glass dropping nozzle the mass of the molten glass drop can be increased by the outer diameter of the front end only when the outer diameter is comparatively small. The mass of the molten glass drop cannot be increased, even if the outer diameter is further increased. Accordingly, a large-sized molded glass product cannot be produced by the method described in Unexamined Japanese Patent Application Publication No. H1-308840. This has created a big problem in the conventional art.

In the method described in Unexamined Japanese Patent Application Publication No. H6-206730, a predetermined amount of molten glass must be retained in the shortest possible time in order to ensure the uniformity of molten glass. At the same time, to permit the molten glass to be separated, the interval of dropping longer than a predetermined time must be provided. For this purpose, the mass of the molten glass drop per drop must be increased. To produce a large-sized molded glass product, the mass of the molten glass drop obtained by the conventional nozzle is insufficient. A solution to this problem has been eagerly anticipated.

The object of the present invention is to solve the aforementioned problems, and to provide a molten glass dropping nozzle capable of allowing a large-sized molten glass drop to fall, and a molded glass product manufacturing method and manufacturing apparatus capable of manufacturing a large-sized molded glass product using the aforementioned molten glass dropping nozzle.

SUMMARY

One aspect of the present invention provides a molten glass dropping nozzle comprising: a molten glass flow path therein for flowing molten glass; and a plurality of openings of the flow path, the plurality of openings being provided on a front end of the molten glass dropping nozzle, wherein the molten glass flowing out of the plurality of openings is stored in the front end and falls as one molten glass drop.

DESCRIPTION OF THE PREFERRED EMBODIMENT

The following describes the embodiment of the present invention with reference to FIGS. 2 through 7:

(Molten Glass Dropping Nozzle)

Figure 2:
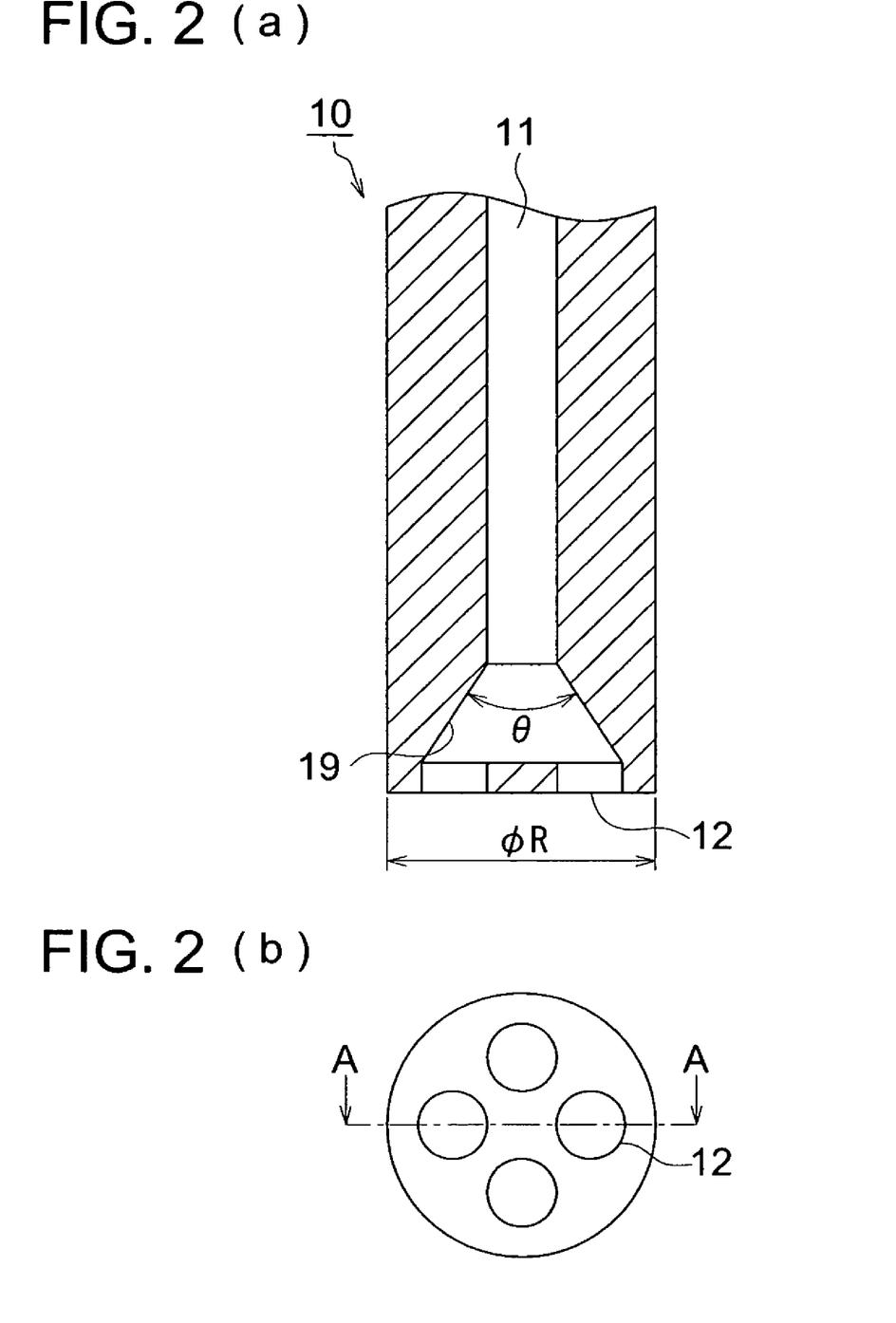
FIGS. 2(a) and 2(b) are drawings representing an example of the molten glass dropping nozzle of the present invention.
Figure 3:
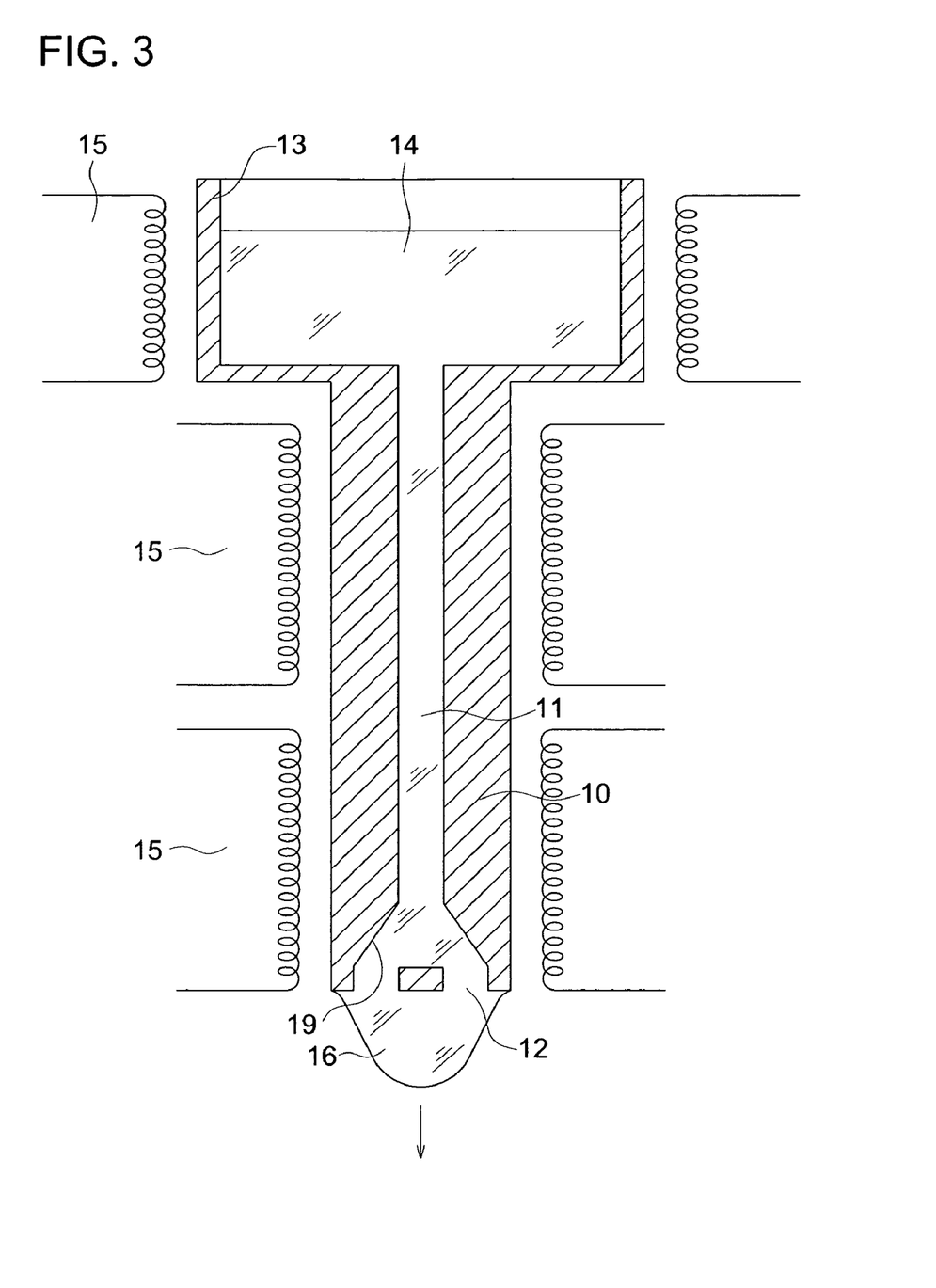
FIG. 3 is a schematic diagram representing the molten glass drop 16 being dropped from the front end of the molten glass dropping nozzle 10.
Figure 4:
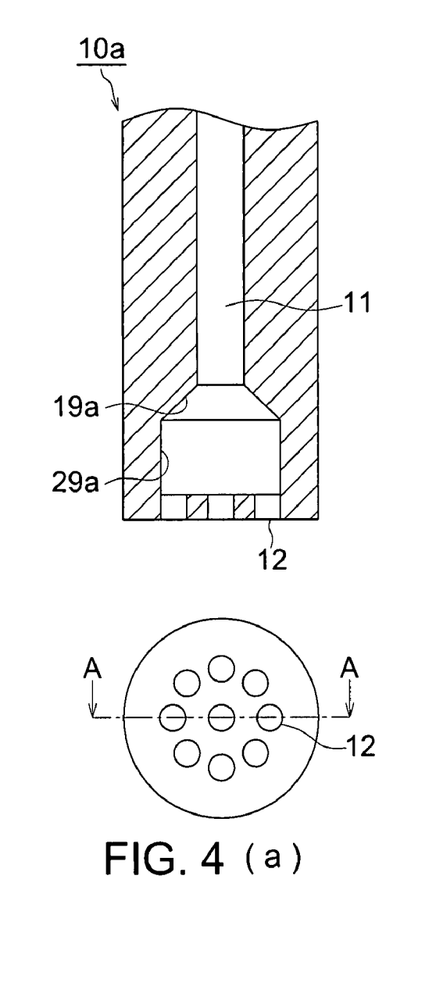
FIGS. 4(a), 4(b) and 4(c) are drawings representing another examples of the molten glass dropping nozzle of the present invention.

Referring to FIGS. 2 through 4, the following describes the molten glass dropping nozzle of the present invention:

FIG. 2 is drawings representing an example of the molten glass dropping nozzle of the present invention. FIG. 2(a) is a cross section taken along arrow line A-A, and FIG. 2(b) shows the nozzle as viewed from the front end (lower side). The molten glass dropping nozzle 10 incorporates a molten glass flow path 11, and the front end is provided with four openings 12. The flow path 11 contains a tapered section 19 wherein the diameter continuously increases with approaching closer to the opening 12.

FIG. 3 is a schematic diagram representing the molten glass drop 16 being dropped from the front end of the molten glass dropping nozzle 10. The nozzle 10 is mounted on the lower portion of the melting furnace 13 for storing the molten glass 14, and the melting furnace 13 and nozzle 10 are heated to a predetermined temperature by a heater 15. The molten glass 14 flows out of the opening 12 of the flow path 11 mounted on the front end of the nozzle 10 through the flow path 11 under its own weight, and is turned into a molten glass drop 16. The molten glass drop 16 is separated from the front end of the nozzle 10 to fall downward when the molten glass drop 16 has reached a predetermined mass.

The nozzle 10 has four openings 12 of the flow path 11 provided on the front end. This arrangement allows the molten glass to flow over an extensive range even in the case of a large outer diameter $\phi R$ wherein the molten glass can reach only the central portion in the conventional nozzle having only one opening 12. Thus, the molten glass drop 16 having a great mass can be dropped.

There is no restriction to the outer diameter $\phi R$ of the front end. The effect of an increase in the mass of molten glass drop resulting from installation of a plurality of openings is more remarkable as the outer diameter $\phi R$ is greater. In the case of the optical glass such as phosphoric acid based glass and lanthanum based glass, when the outer diameter $\phi R$ is equal to or greater than 15 mm, the molten glass can reach only the central portion in the conventional nozzle, although this may differ according to the conditions such as the type of glass. Thus, the remarkable effect of the present invention can be demonstrated. On the other hand, if the outer diameter $\phi R$ is increased in excess of the diameter of 30 mm, there is likely to be an increase of variations in the mass of the molten glass drop obtained and the dropping position. For these reasons, the outer diameter of the front end is preferably in the range of 15 mm or more without exceeding 30 mm in terms of diameter in particular.

If the area of the opening 12 is too small, the passage of the molten glass is blocked and the molten glass coming through the flow path 11 may be retained just before the opening 12 in some cases. If this occurs, transparency may be lost or composition may be changed due to volatilization, depending on the type of glass. To completely solve the problem raised by the retention of the molten glass, the sum of the areas of a plurality of the openings 12 is preferably nearly equal to or greater than the sectional area of the flow path 11.

When the molten glass running through one flow path 11 is made to flow out of a plurality of openings 12, the diameter of the flow path 11 must be increased with approaching to the front end of the nozzle 10. However, if there is an abrupt increase in the diameter of the flow path 11, the area having a very small flow rate of the molten glass will be formed on the periphery of the flow path 11. If this occurs, the molten glass retention time in that area will be much prolonged, and transparency may be lost or composition may be changed due to volatilization, depending on the type of glass. The flow path 11 preferably contains a tapered section 19 wherein the diameter continuously increases with approaching closer to the opening 12.

If the opening angle ($\theta$) of the tapered section 19 is excessive, there may remain the area wherein the flow rate of the molten glass is reduced. Conversely, if the opening angle ($\theta$) of the tapered section 19 is insufficient, the length of the tapered section 19 will be excessive to get the required diameter, so that a large-sized heating apparatus must be utilized. Thus, the opening angle of the taper is preferably in the range of 20° through 150°, more preferably in the range of 30° through 120°. It is also possible to adopt a continuously changing curved surface without the opening angle being constant.

The material commonly known as the material of the melting furnace for molten glass or the nozzle can be properly selected and used as the material of the nozzle 10. For example, platinum, other platinum-related metal (ruthenium, rhodium, palladium, osmium and iridium), gold or alloys thereof can be used. In particular, platinum and platinum-based alloy are preferably used because of low reactivity with the molten glass.

An appropriate heater 15 can be selected from among the commonly known heating devices. A kanthal heater, platinum heater and high-frequency induction heating apparatus can be taken as examples. The nozzle 10 can be heated by direct application of electric current. Further, the entire nozzle 10 can be heated by one heater, or the nozzle 10 can be divided into a plurality of blocks and each block can be provided with a heater so as to perform independent temperature control.

There is no restriction to the type of the molten glass to be used. The commonly known glass can be selected for use according to particular application requirements. Such an optical glass as phosphoric acid based glass and lanthanum based glass can be used as an example.

The heating temperature of the nozzle 10 is adjusted according to the type of the molten glass. Generally, if the nozzle temperature is excessive, the viscosity of the molten glass is insufficient, with the result that stable molten glass drop cannot be obtained or the quality may be deteriorated by the sparkling of the molten glass. Conversely, if the nozzle temperature is insufficient, the viscosity of the molten glass is excessive, with the result that the required flow rate cannot be obtained or the quality may be deteriorated by loss of transparency (crystallization). The appropriate temperature range differs according to such conditions as the type of the molten glass, nozzle length, outer diameter, diameter of the flow path and required flow rate, and hence should preferably be determined by preliminary test.

FIG. 4 is a drawing representing another example of the molten glass dropping nozzle of the present invention. FIGS. 4(a), 4(b) and 4(c) show the molten glass dropping nozzles 10a, 10b and 10c, respectively. The upper portions of these drawings illustrate the cross sections taken along arrow line A-A, while the lower portions show the nozzles as viewed from the front end (lower surface).

Nine openings 12 of the flow path 11 are arranged on the front end of the nozzle 10a of FIG. 4(a). As described above, the present invention only requires that a plurality of openings 12 of the flow path 11 are provided. To ensure stable fall of the molten glass, the openings 12 are arranged uniformly on the front end of the nozzle.

The flow path 11 of the nozzle 10a has a tapered section 19a characterized by a continuously increasing diameter, and is connected with the opening 12 through the straight portion having a constant diameter. The tapered section of the flow path can be directly connected with the opening or can be connected with the opening through a straight portion, as described above.

In the nozzle 10b of FIG. 4(b), the opening 12 is not circular. Four approximately trapezoidal openings 12 are arranged in a radial direction. There is no particular restriction to the shape of the opening, which should be determined according to the given conditions. Further, the nozzle 10b has an outer diameter which is greater one goes closer to the front end of the nozzle, and other outer diameters are smaller. As will be described later, the material of the nozzle is very expensive. As described above, the outer diameter close to the front end is large and the diameters in other places are small. This structure reduces the amount of the material used to manufacture the nozzle.

The tapered section 19b of the flow path 11 of the nozzle 10b has a curved surface wherein the opening angle exhibits a continuous change.

The nozzle 10c of FIG. 4(c) incorporates four independent flow paths 11. The opening 12 corresponding to each flow path 11 is arranged on the front end. Thus, the present invention can be embodied in a structure wherein each opening 12 has a flow path 11, as described above. Alternatively, it can be embodied in a structure wherein one flow path 11 commonly used for a plurality of openings 12.

(Molded Glass Product Manufacturing Method and Apparatus)

Embodiment 1

Figure 5:
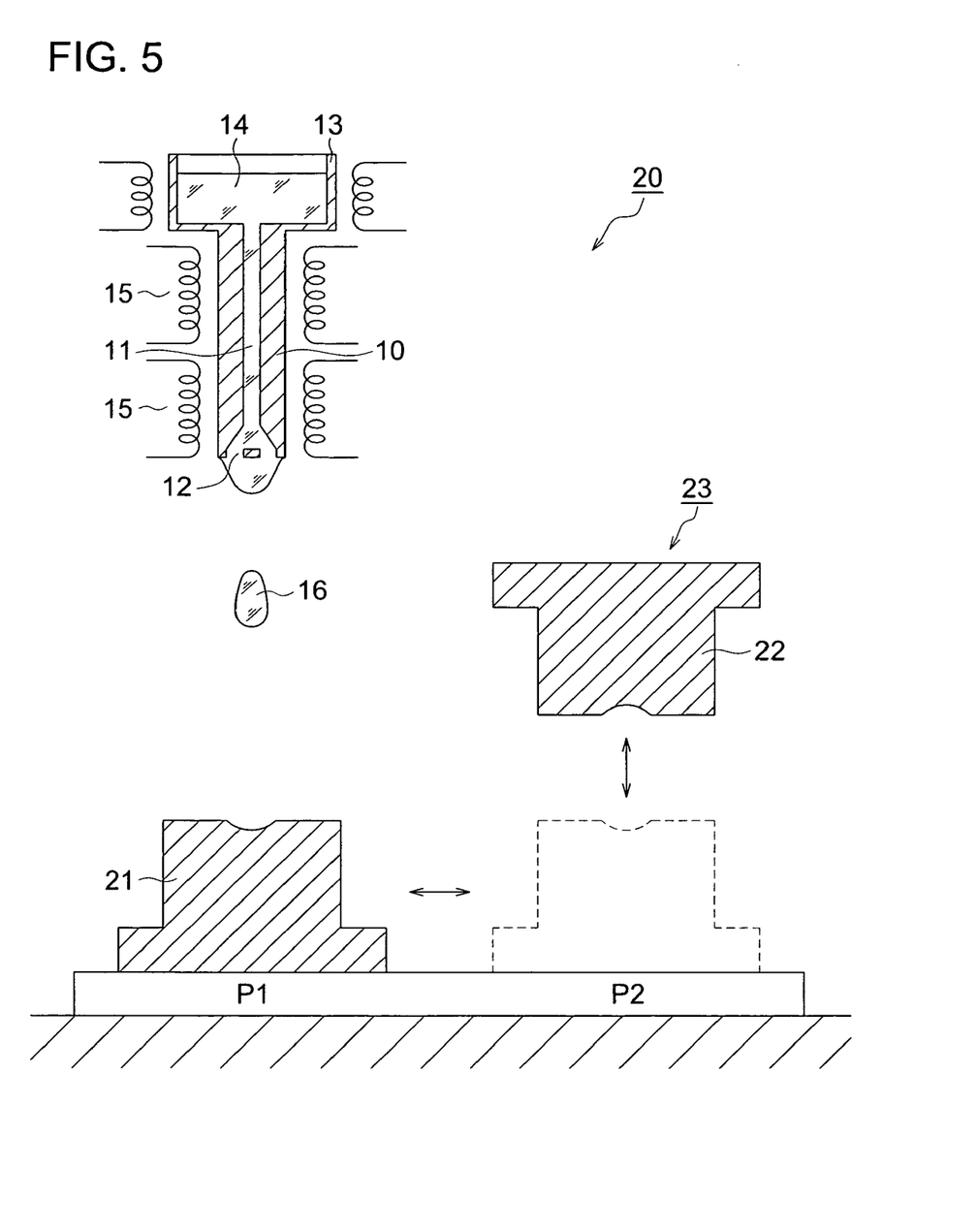
FIG. 5 is a schematic diagram representing a molded glass product manufacturing apparatus 20 (supply process)
Figure 6:
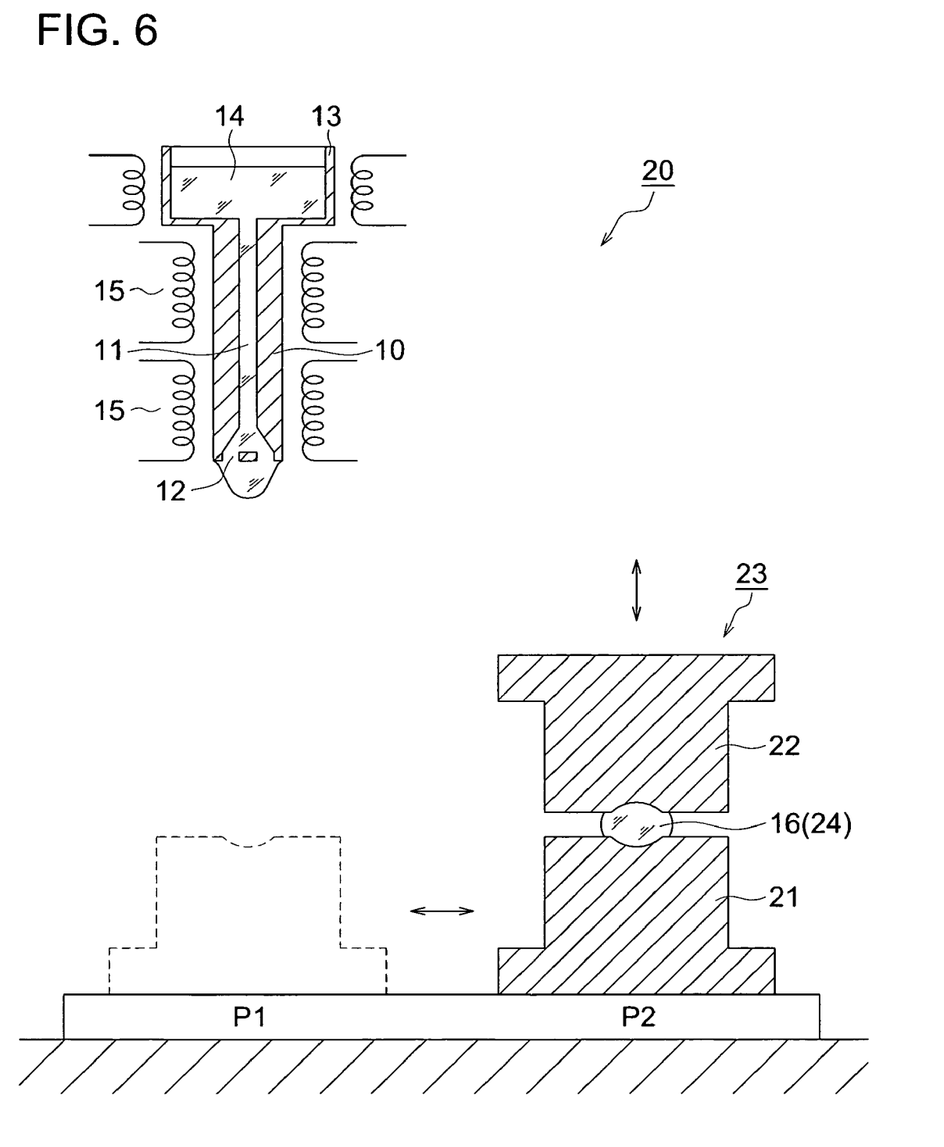
FIG. 6 is a schematic diagram representing a molded glass product manufacturing apparatus 20 (press process)

Referring to FIG. 2, the following describes the first embodiment of the molded glass product manufacturing method and apparatus in the present invention. FIGS. 5 and 6 are schematic diagrams representing a molded glass product manufacturing apparatus 20. FIG. 5 shows the supply process wherein a molten glass drop falls from the nozzle and is supplied to the lower die. FIG. 6 shows the press process wherein the supplied molten glass drop is molded under pressure.

The molded glass product manufacturing apparatus 20 has a molten glass dropping nozzle 10. The nozzle 10 is the molten glass dropping nozzle 10 of the present invention shown in FIG. 2. It is mounted on the lower part of the melting furnace 13 for storing the molten glass 14, and is heated to a predetermined temperature by the heater 15.

The molded glass product manufacturing apparatus 20 has a molding die 23 equipped with an lower die 21 and upper die 22. The lower die 21 is configured to be able to be moved, by a driven device (not illustrated), between the drop position P1 for receiving the molten glass drop 16 below the nozzle 10, and the molding position P2 face to face with the upper die 22 to apply pressure to the molten glass drop 16. Further, the upper die 22 is configured to be able to be moved, by a drive device (not illustrated), in the direction (in the vertical direction) of applying pressure to the molten glass drop between the lower die 21 and upper die 22.

The material of the molding die 23 can be appropriately selected from among the materials commonly known for the molding die used to produce a molded glass product by press molding. Various heat resistant alloys (stainless steel, etc.), cemented carbide materials mainly composed of tungsten carbonate, various ceramics (e.g., silicon carbonate, silicon nitrate, aluminum nitrite), and composite materials containing carbon can be used as examples. Further, a protective layer made up of various metals, ceramic, carbon or others can be formed on the surface of these materials. The lower die 21 and upper die 22 can be made of the same material, or different materials.

The molding die 23 can be heated to a predetermined temperature by the heating device (not illustrated), and is preferably formed in a structure wherein each temperature of the lower die 21 and upper die 22 can be controlled independently. The heating device can be selected appropriately from among commonly known heating devices. For example, it is possible to use a cartridge heater built in a heated member, sheet-like heater used in contact with the outside of the heated member, infrared heating apparatus and high-frequency induction heating apparatus.

In the present invention, the molten glass drop 16 is separated from the nozzle 10 and is made to fall on the lower die 21. The molding die 23 applies pressure to the molten glass drop 16 having fallen, whereby a product is molded. The following describes this procedure in sequence:

In the first place, the molding die 23 is heated to a predetermined temperature. The predetermined temperature is selected appropriately to ensure that a satisfactory transfer surface is formed on the molded glass product by press molding. Generally, if the temperatures of the lower die 21 and upper die 22 are too low, a satisfactory transfer surface cannot be formed on the molded glass product. Conversely, if these temperatures are too high, fusion bond will occur between glass and molding die or the service life of the molding die will be reduced. In actual practice, the appropriate temperature differs according to various conditions such as the type, shape and size of glass, the material of the molding die, type of the protective film, the shape and size of the molded glass product, and the positions of the heater and temperature sensor. Thus, the appropriate temperature is preferably obtained on an experimental basis. Normally, the temperature is preferably set in the range from Tg (glass transition point of glass)−100° C. through Tg+100° C. The heating temperatures of the lower die 21 and upper die 22 can be the same or different from each other.

Then the lower die 21 is moved to the molding position P1 so that the molten glass drop 16 is dropped from the nozzle 10. The molten glass 14 stored in the melting furnace 13 passes through the flow path 11 arranged inside the nozzle 10 under its own weight and comes out of the openings 12 on the front end. The flows of molten glass coming out of the four openings 12 are merged with one another at the front end to form one large molten glass drop 16. When a predetermined mass has been reached, the molten glass drop 16 is naturally separated from the nozzle 10 to fall down.

When the molten glass drop 16 has reached the lower die 21, the lower die 21 moves to the molding position P2 so that the upper die 22 is moved downward, whereby pressure is applied. During the press molding operation, the heat of the molten glass drop 16 is reduced by the surface of contact with the lower die 21 and upper die 22, and cooling takes place. After the lapse of a predetermined period of time, pressure is released and the upper die 22 is moved upward. The pressing time should be the time when the molten glass drop 16 is cooled to the temperature wherein the shape of the transfer surface is not deformed even after the pressure by the molding die 23 has been released. The temperature wherein the shape of the transfer surface is not deformed even after the pressure has been released is normally reached by cooling down the temperature level close to Tg of the glass, although it depends on the type of glass, size and shape of the molded glass product, required accuracy and others.

The load applied to press the molten glass drop 16 can be constant at all times, or can be changed according to time. To improve the transfer accuracy, the load not less than a predetermined level is preferably applied so that the molten glass drop 26 and molding die 23 can be kept in close contact with each other. The magnitude of the load can be appropriately set in response to the size of the molded glass product to be manufactured. There is no particular restriction to the drive device that moves the upper die 22 in the vertical direction. It can be selected appropriately from among the commonly known drive devices such as an air cylinder, hydraulic cylinder and powered cylinder driven by a servo motor.

After the upper die 22 has been moved upward, the molded glass products 24 having been produced are collected. The process of manufacturing the molded glass products is now complete. The molded glass products 24 can be collected by a commonly known mold releasing apparatus based on vacuum suction, for example. To continue manufacture of the molded glass products, the lower die 21 is again moved to the drop position P1, and the procedure thereafter is repeated.

The method of manufacturing the molded glass product in the present invention may contain other processes than those described above. For example, a process of cleaning the molding die 23 can be provided after the molded glass product has been collected.

Embodiment 2

Figure 7A:
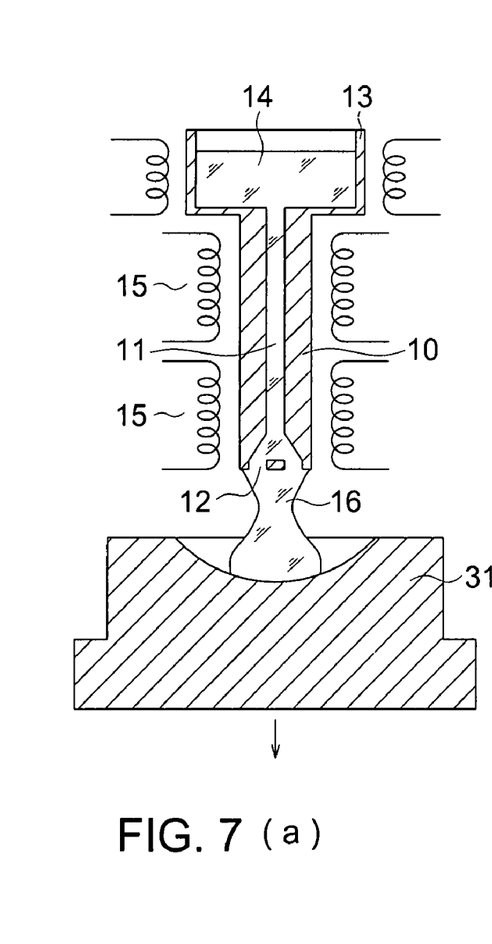
FIGS. 7(a), 7(b) and 7(c) are schematic diagrams representing the process in the second embodiment of the molded glass product manufacturing method of the present invention.
Figure 7B:
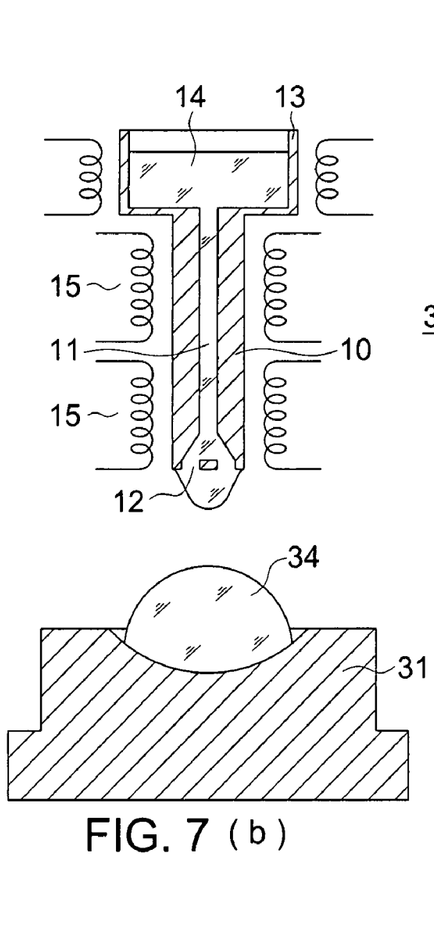
Figure 7C:
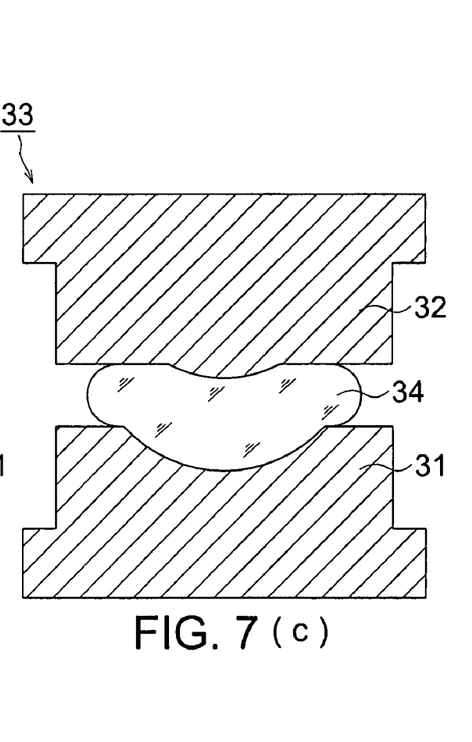

Referring to FIG. 7, the following describes the second embodiment of the molded glass product manufacturing method and molded glass product manufacturing apparatus of the present invention. FIG. 7 is a schematic diagram representing the processes in the molded glass product manufacturing method of the present invention. In the molded glass product manufacturing method in the present embodiment, a plurality of molten glass drops are retained in the lower die without the nozzle and molten glass drop being separated from each other (FIG. 7(a)), and the lower die is retracted so that a predetermined amount of molten glass is separated from the nozzle (FIG. 7(b)). After that, the molding die is used to perform press molding (FIG. 7(c)).

The molding die 33 equipped with the lower die 31 and upper die 32 is heated to a predetermined temperature in advance. The material and heating temperature of the molding die 33 are the same as those of the molding die 23 already explained with reference to the first embodiment.

The molten glass dropping nozzle 10 and melting furnace 13 are heated to a predetermined temperature by the heater 15 so that the molten glass drop 16 will come out of the front end of the nozzle 10 at a predetermined interval. Generally, if the temperature of the nozzle 10 is increased, the viscosity of the molten glass is reduced, and hence the flow rate is increased, with the result that the glass drop interval is decreased. Thus, the heating temperature of the nozzle 10 is adjusted within the range wherein the quality of the molten glass drop is not adversely affected, whereby the glass drop interval can be adjusted as required.

Under this condition, the lower die 31 is placed close to the front end of the nozzle 10 so that molten glass equivalent to a plurality of drops is retained in the lower die 31, without the nozzle 10 and molten glass drop 16 being separated from each other (FIG. 7(a)). When a predetermined amount of molten glass has been retained, the lower die 31 is retracted from the front end of the nozzle 10 so that the molten glass is separated, whereby the process of supplying the molten glass terminates (FIG. 7(b)).

In the meantime, the molten glass is cooled sequentially from the portion coming in contact with the lower die 31. Thus, to get a uniform molded glass product, a predetermined amount of molten glass should preferably be retained in the shortest possible time. For this purpose, it is necessary to increase the flow rate of the molten glass passing through the flow path 11. Especially when a large-sized molded glass product is to be manufactured, the flow rate must be increased. In the conventional nozzle, however, the mass of the molten glass per drop was so small that an increase in the flow rate of the molten glass led to shortening of the drop interval. Thus, when the lower die was placed close to the front end of the nozzle, and the lower die was retracted to separate the molten glass, the lower die had to be moved at a very high speed, with the result a stable operation could not achieved, in the conventional nozzle.

In the present invention, the nozzle 10 is the molten glass dropping nozzle 10 of the present invention shown in FIG. 2. The flows of molten glass coming out of four openings 12 are merged with one another at the front end to fall down forming one molten glass drop. Thus, the mass of each molten glass drop is large. Thus, when a large-sized molded glass product is manufactured, a sufficient glass drop interval can be ensured even if the flow rate of the molten glass is increased. This arrangement ensures a stable supply operation.

The molten glass 34 supplied on the lower die 31 is subjected to press molding by the lower die 31 and upper die 32 (FIG. 7(c)). While being pressed by the lower die 31 and upper die 32, the molten glass 34 is further cooled and solidified to become a molded glass product. After that, pressure is released, and a molded glass product is taken out of the molding die 33.

The molded glass product having been manufactured can be preferably used for various optical elements such as a lens, prism, diffraction element and mirror. Among others, various types of mirrors wherein one of the molded surfaces is used as a reflecting surface preferably use the molded glass product of the present invention since those require no internal quality such as striae.

EXAMPLE

The following describes the examples of the embodiments for confirmation of the advantages of the present invention. However the present invention is not limited thereto.

Examples 1 Through 5

The molten glass was dropped using the molten glass dropping nozzle 10 of FIGS. 2 and 3. Five nozzles 10 made of platinum were used. They had the outer diameters φR of 10 mm (Example 1), 15 mm (Example 2), 20 mm (Example 3), 25 mm (Example 4) and 30 mm (Example 5). The flow path 11 had a diameter of 2.5 mm, and the opening 12 has a diameter of 1.3 mm. The opening 12 was mounted at each four positions wherein the circumferences each having diameters of 5 mm (Example 1), 7.5 mm (Example 2), 10 mm (Example 3), 12.5 mm (Example 4) and 15 mm (Example 5) were equally divided into four parts, respectively. The opening angle (θ) of the tapered section 19 was set at 90° C.

The phosphoric acid glass having a Tg of 480° C. and a specific gravity of 3.2 was used as the glass in this Example. The nozzle 10 was heated to a temperature of 1,000° C. and the molten glass was dropped. The mass of the molten glass drop and the glass drop interval were measured.

TABLE 1

| | Number of apertures | Outer diameter φR of front end (mm) | Mass of molten glass drop (mg) | Glass drop interval (seconds) |
| --- | --- | --- | --- | --- |
| Example 1 | 4 | 10 | 315 | 4 |
| Example 2 | 4 | 15 | 470 | 6 |
| Example 3 | 4 | 20 | 620 | 8 |
| Example 4 | 4 | 25 | 760 | 10 |
| Example 5 | 4 | 30 | 910 | 12 |
| Comparative example 1 | 1 | 10 | 310 | 4 |
| Comparative example 2 | 1 | 15 | 450 | 6 |
| Comparative example 3 | 1 | 20 | 460 | 6 |
| Comparative example 4 | 1 | 25 | 460 | 6 |
| Comparative example 5 | 1 | 30 | 460 | 6 |

The mass of the molten glass drop increased in proportion to the outer diameter φR of the front end. In the nozzle having a diameter of 30 mm, 910 mg of molten glass drop could be obtained. Further, the glass drop interval was 12 seconds—a sufficient time interval for the supply operation illustrated in FIG. 7.

Comparative Examples 1 Through 5

The molten glass was dropped using the conventional nozzle illustrated in FIG. 1(a). Nozzles made of platinum were used, wherein one opening was provided at the center, and the diameter thereof was 2.5 mm. The diameter φra of the flow path 2a was 2.5 mm. Five nozzles were used, and they had the outer diameters φRa of the front end were 10 mm (Example 1), 15 mm (Example 2), 20 mm (Example 3), 25 mm (Example 4) and 30 mm (Example 5). The mass of the molten glass drop and the glass drop interval were measured under the same conditions of glass material, heating temperature and others as those in the Example 1. The results are also shown in Table 1.

In all cases, the mass of the molten glass drop was smaller than that in the example wherein the nozzle of the same diameter was used. Especially when the outer diameter φRa was 15 mm or more without exceeding 30 mm (Comparative Examples 2 through 5), a marked difference from the Example was observed.

In the present embodiment, a plurality of openings for the molten glass flow path are provided on the front end of the molten glass dropping nozzle. Thus, the molten glass coming out of the openings can be spread over an extensive range at the front end of the nozzle, and this arrangement allows the molten glass of greater mass to be dropped. Further, use of such a molten glass dropping nozzle ensures a large-sized molded glass product to be manufactured.

What is claimed is:

1. A molded glass product manufacturing method using a molten glass dropping nozzle, the nozzle having a molten glass flow path therein for flowing molten glass, and having a plurality of openings provided on a flat surface of a front end thereof, the flat surface defining a distal end of the nozzle with no structure protruding forward of the flat surface, the method comprising the steps of:
   dropping a molten glass drop from the nozzle and supplying the molten drop to a lower die;
   molding the supplied molten glass drop under pressure by use of a molding die including the lower die and an upper die;
   wherein the molten glass emerges from the plurality of openings, and is merged at the front end of the nozzle to form a single molten glass drop; and
   wherein the molten glass flowing out of the plurality of openings accumulates at the flat surface of the front end of the nozzle, and is separated from the flat surface as a single molten glass drop.

2. The molded glass product manufacturing method according to claim 1, wherein the molten glass drop is separated from the flat surface of the nozzle and thereafter drops on to the lower die.

3. The molten glass product manufacturing method according to claim 2, wherein the flow path of the molten glass dropping nozzle comprises a tapered section wherein a diameter of the tapered section continuously increases in a direction approaching closer the openings.

4. The molded glass product manufacturing method according to claim 1, wherein dropping step includes;
   retaining molten glass equivalent to a plurality of drops in the lower die without separating the molten glass drop from the nozzle, by placing the lower die close to the front end of the nozzle; and retracting the lower die so that a predetermined amount of molten glass is separated from the molten glass dropping nozzle.

5. The molten glass product manufacturing method according to claim 1, wherein an outer diameter of the front end of the molten glass dropping nozzle is in a range of 15 mm to 30 mm.

6. The molten glass product manufacturing method according to claim 1, wherein the flow path of the molten glass dropping nozzle comprises a tapered section, wherein a diameter of the tapered section continuously increases in a direction approaching the openings.

7. A molded glass product manufacturing method using a molten glass dropping nozzle, the nozzle having a molten glass flow path therein for flowing molten glass, and having a plurality of openings provided on a flat surface of a front end thereof, the flat surface defining a distal end of the nozzle with no structure protruding forward of the flat surface, the method comprising the steps of:

dropping a molten glass drop from the nozzle and supplying the molten drop to a lower die;

molding the supplied molten glass drop by use of a molding die including the lower die;

wherein the molten glass emerges from the plurality of openings, and is merged at the front end of the nozzle to form a single molten glass drop; and wherein the molten glass flowing out of the plurality of openings accumulates at the flat surface of the front end of the nozzle, and is separated from the flat surface as a single molten glass drop.

* * * * *

UNITED STATES PATENT AND TRADEMARK OFFICE
CERTIFICATE OF CORRECTION

PATENT NO. : 8,061,161 B2  Page 1 of 1
APPLICATION NO. : 12/154252
DATED : November 22, 2011
INVENTOR(S) : Toshiya Tomisaka It is certified that error appears in the above-identified patent and that said Letters Patent is hereby corrected as shown below:

In the Claims

In column 10, claim 3, line 61, after "approaching" delete "closer".

Signed and Sealed this
Twenty-eighth Day of August, 2012

David J. Kappos
*Director of the United States Patent and Trademark Office*